(12) United States Patent
Blum

(10) Patent No.: US 8,770,562 B1
(45) Date of Patent: Jul. 8, 2014

(54) CUTTING BOARD WITH ADJUSTABLE TROUGH

(71) Applicant: Alvin S. Blum, Fort Lauderdale, FL (US)

(72) Inventor: Alvin S. Blum, Fort Lauderdale, FL (US)

( * ) Notice: Subject to any disclaimer, the term of this patent is extended or adjusted under 35 U.S.C. 154(b) by 0 days.

(21) Appl. No.: 13/986,788

(22) Filed: Jun. 5, 2013

(51) Int. Cl.
*B23Q 3/00* (2006.01)
*A47J 47/00* (2006.01)
*A47J 47/01* (2006.01)

(52) U.S. Cl.
CPC ............... *A47J 47/005* (2013.01); *A47J 47/01* (2013.01)
USPC ............ 269/13; 269/289 R; 269/16; 269/290

(58) Field of Classification Search
CPC ............ A47J 47/00; A47J 43/00; B23Q 3/00
USPC ............... 269/13, 289 R, 290, 293, 16, 302.1
See application file for complete search history.

(56) References Cited

U.S. PATENT DOCUMENTS

| 4,447,051 A * | 5/1984 | Price ..................... 269/302.1 |
| 6,164,478 A | 12/2000 | Cant |
| 6,536,753 B1 | 3/2003 | Keener |
| 6,971,644 B1 | 12/2005 | Kennedy |
| 8,141,860 B2 | 3/2012 | Goldman |

* cited by examiner

*Primary Examiner* — Lee D Wilson
*Assistant Examiner* — Seahee Yoon
(74) *Attorney, Agent, or Firm* — Alvin S. Blum

(57) ABSTRACT

A cutting board has two opposed longitudinal edges, two opposed transverse edges, a first diagonal edge between the first transverse edge and a first longitudinal edge, a second diagonal edge between the first transverse edge and a second longitudinal edge. The edges define broad upper and lower cutting board surfaces. A permanent magnet is affixed to each of the diagonal edges. Two elongate ferromagnetic fences have first and second legs disposed at right angles. In a dispensing trough position the second leg is engaged by the magnet to hold the second leg tightly against the diagonal edge with the first leg lying flat against the lower broad surface to thereby provide two fence members extending above the cutting surface to guide cut items toward an opening defined by a space between the fence members at a transverse edge. The size of the opening is adjusted by moving the fences.

15 Claims, 4 Drawing Sheets

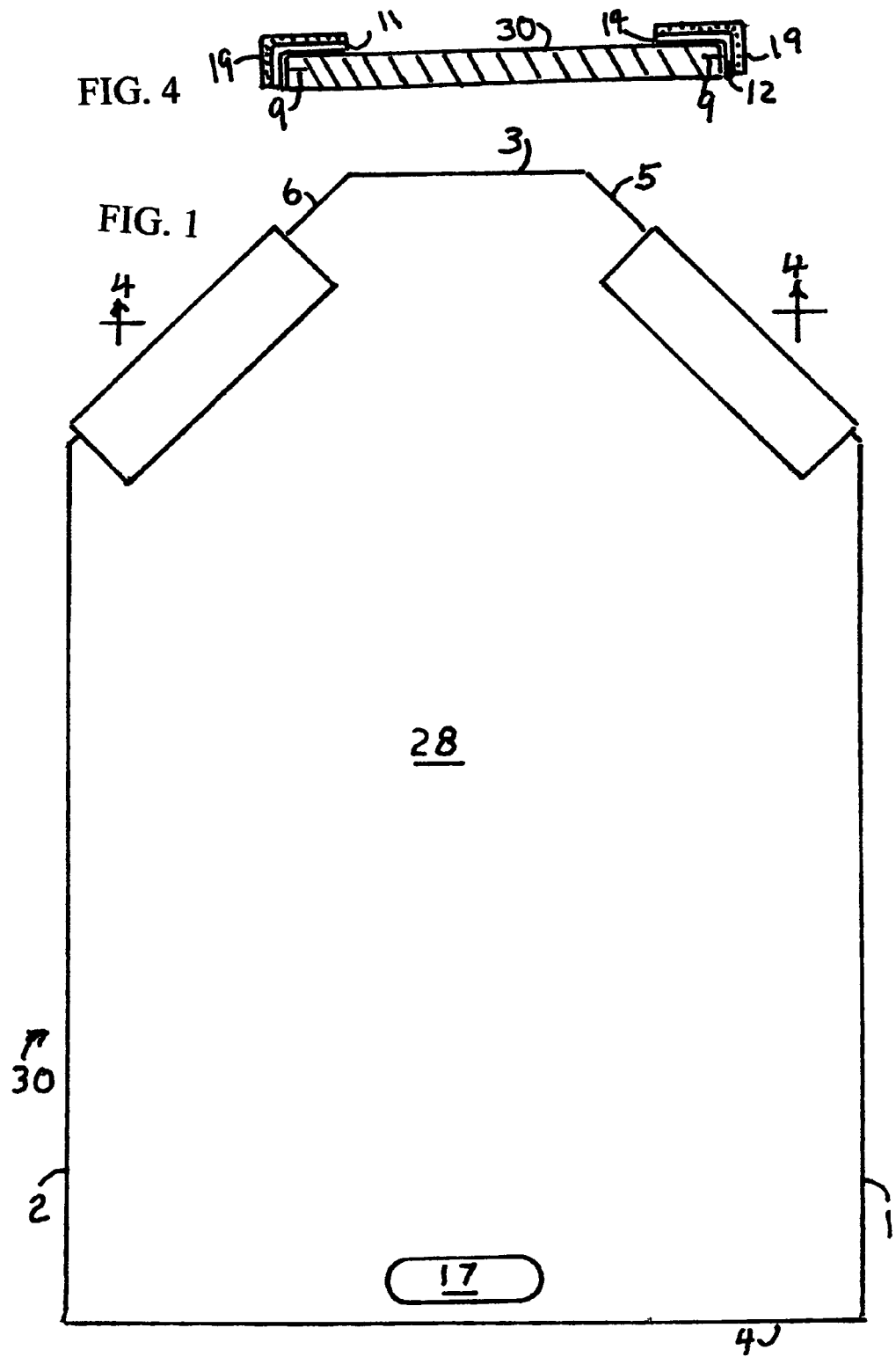

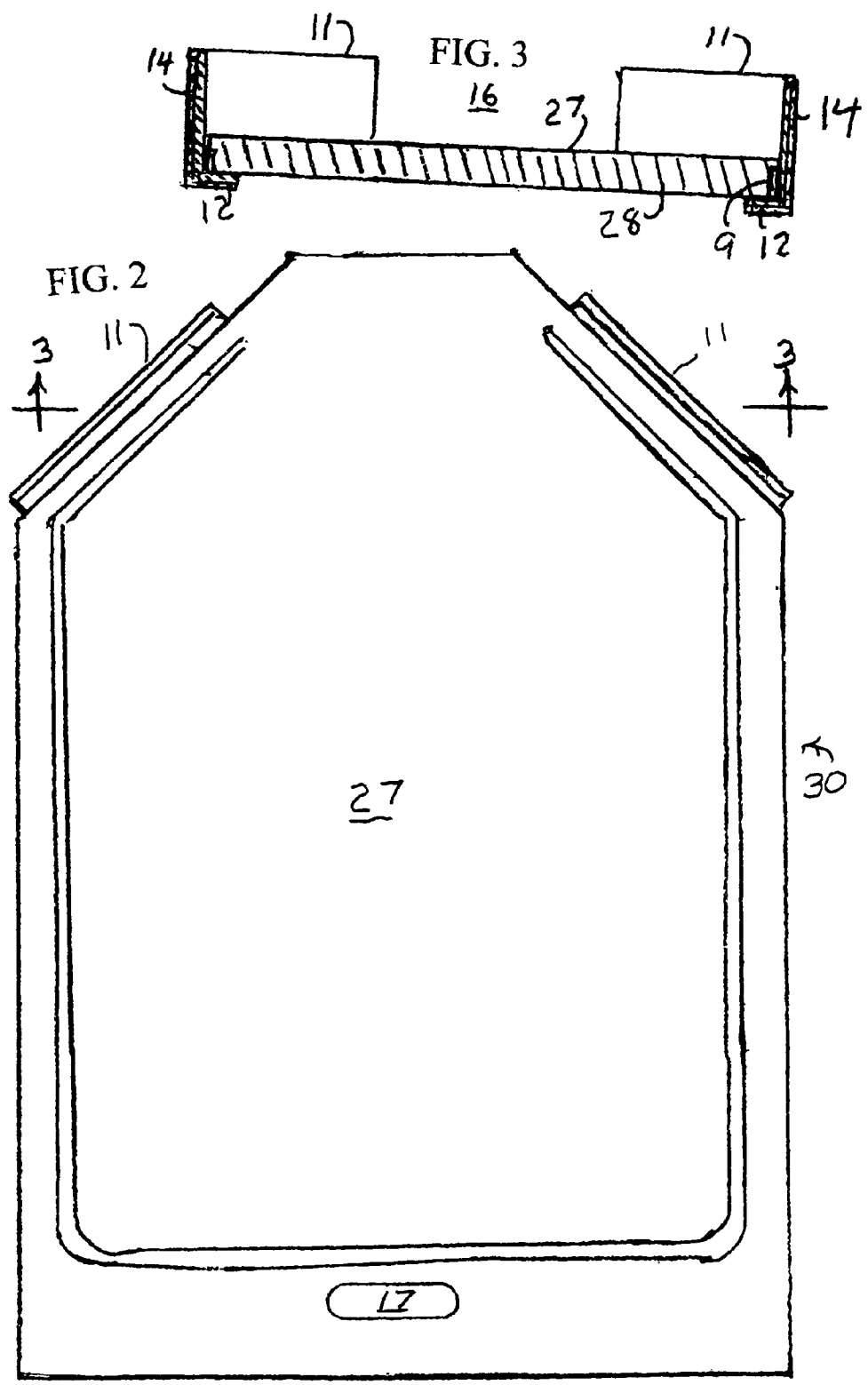

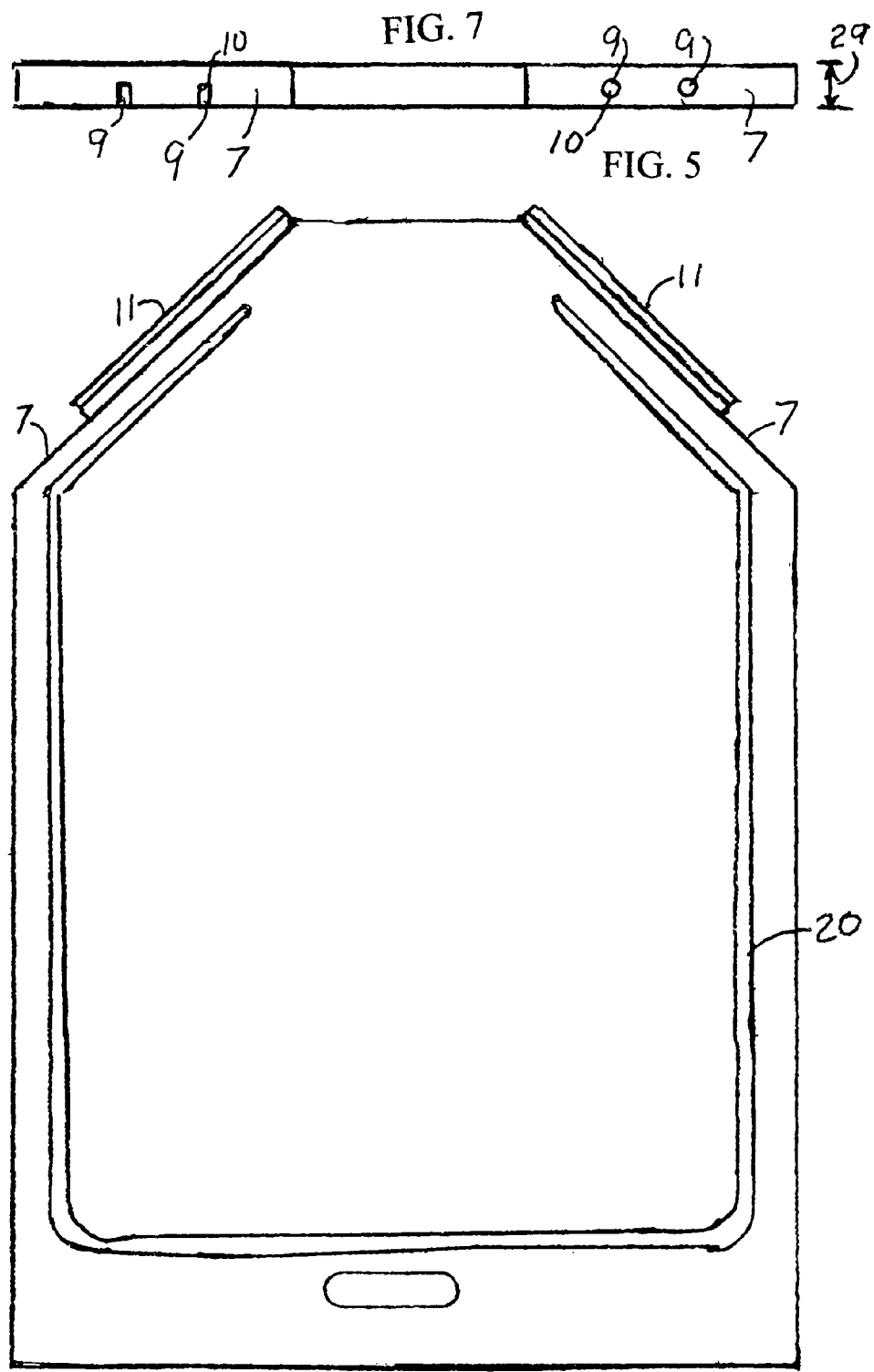

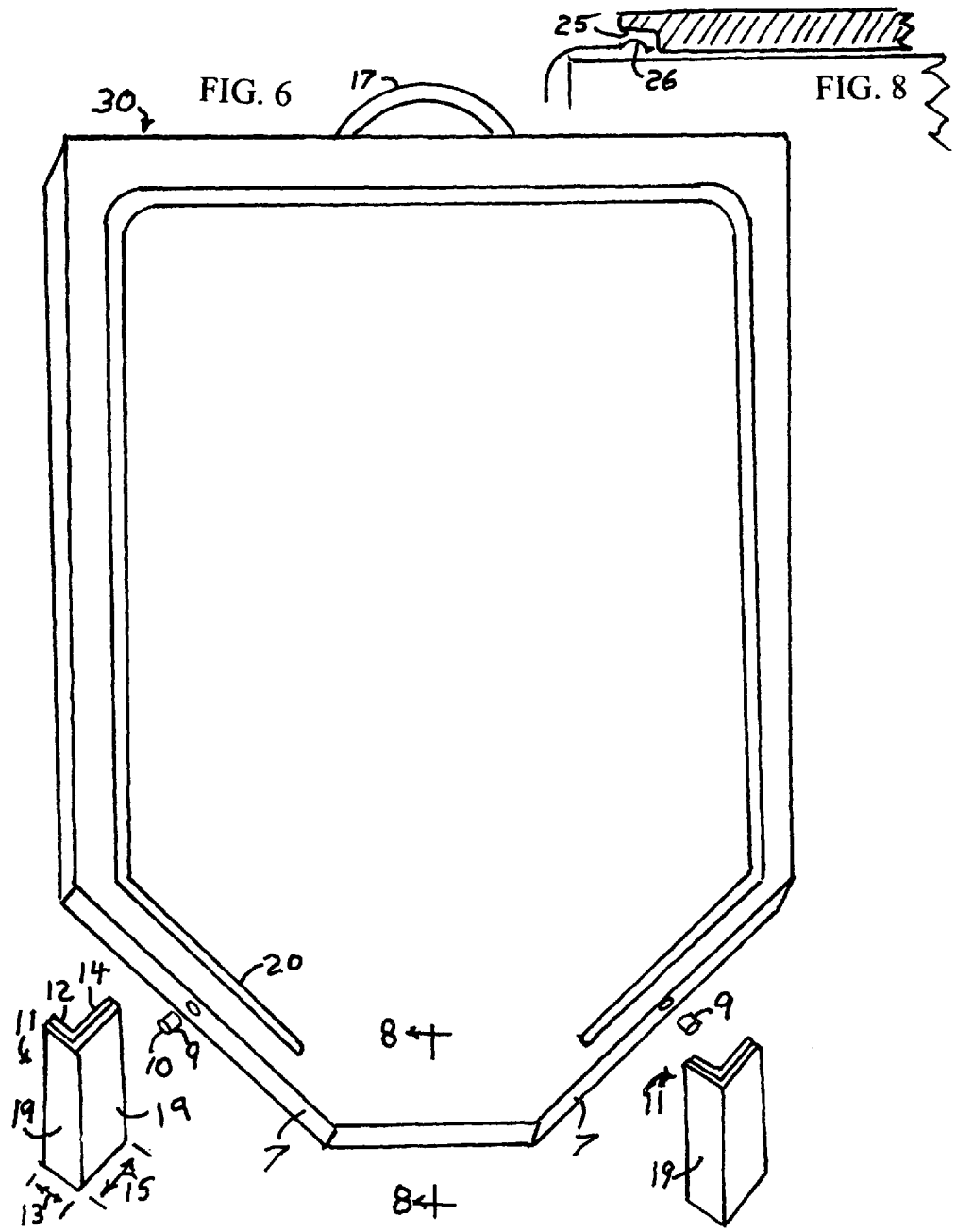

CUTTING BOARD WITH ADJUSTABLE TROUGH

This application claims the benefit of provisional patent application No. 61/853,292 filed Apr. 2, 2013 incorporated herein by reference in its entirety.

BACKGROUND OF THE INVENTION

This invention relates to improved cutting boards and means for dispensing the material after cutting. Prior art cutting boards have provided means for dispensing the material after it has been cut up. These have been complex and may incorporate a trough and receptacle for receipt of the cut material. The material must then be transferred to another receptacle for use. Other cutting boards are made of flexible material that may be folded to a funnel shape for pouring out the cut material. To prevent sliding of the board during use, many boards are provided with rubbery material on the underside. That may preclude use of the underside as a cutting surface.

SUMMARY OF THE INVENTION

This invention provides improvements in cutting boards, and more particularly to cutting boards having elements that convert the board to a dispensing trough after cutting for direct dispensing into a receptacle for use. Receptacles receiving the cut materials may have different dimensions for different uses, such as frying pans and jars. It would be useful if the trough could be adjustable to better dispense into a receptacle of a particular dimension. It would be useful for the cutting board to be free of elements not necessary for the cutting operation for ease of use and cleaning. Embodiments of the invention provide a cutting board member having a flat horizontal cutting surface unencumbered by any elements extending above the cutting surface during cutting operation. Embodiments of invention provide a cutting board member that is monolithic, with no moving parts for ease of cleaning. Embodiments of the invention provide a board that is convertible to a dispensing trough after the cutting operation. The dimensions of the dispensing trough may be adjustable to better accommodate receptacles of different dimensions. The cutting board of the invention includes a monolithic cutting board member and two removable and adjustable elements that convert the cutting board into a dispensing trough that is adjustable. The removable and adjustable elements may prevent the board from sliding during cutting operations. These and other advantages will appear from the following detailed description of illustrative embodiments of the present invention.

BRIEF DESCRIPTION OF THE DRAWINGS

FIG. 1 is a bottom plan view of the invention in cutting or storage mode.
FIG. 2 is a top plan view of the device of FIG. 1 in dispensing trough mode.
FIG. 3 is a sectional view through line 3-3 of FIG. 2.
FIG. 4 is a sectional view through line 4-4 of FIG. 1.
FIG. 5 is plan view as in FIG. 2 adjusted for dispensing into a narrow container.
FIG. 6 is an exploded view of the invention.
FIG. 7 is a front elevation of the cutting board.
FIG. 8 is a sectional view through line 8-8 of FIG. 6.

DETAILED DESCRIPTION OF PREFERRED EMBODIMENTS

Referring now to the drawings, a generally monolithic cutting board member 30 with a thickness 29 has opposed first longitudinal edge 1 and second longitudinal edge 2, opposed first transverse edge 3 and second transverse edge 4, a first fence support, or first diagonal edge, 5 between the first transverse edge and the first longitudinal edge, a second fence support, or second diagonal edge, 6 between the first transverse edge and the second longitudinal edge. The longitudinal edges, the transverse edges, and the diagonal edges forming a perimeter that defines an upper broad surface 27 and an opposed lower broad surface 28. Each of the diagonal edges has an elongate planar face 7 that is at right angles to the two broad surfaces. Permanent magnets 9 are embedded in the faces 7 of the diagonal edges such that the outer face 10 of each magnet is coplanar with the face 7. The cutting board may have a drainage groove 20 to catch liquids. The board may also be provided with a handle or aperture 17 for hanging storage or for grasping.

The cutting board assembly is also provided with two elongate ferromagnetic fence elements 11, each element has a first leg 12 and a second leg 14 disposed at right angles to the first leg, the first leg extends from the second leg a distance 13 that is no greater than the thickness 29 of the board member. The second leg 14 extends from the first leg a distance 15 that is at least twice that of the thickness of the board member.

The fence elements are separable from the board member during cleaning and may be attached to the board for cutting, transport and storage. They are adapted to cooperate with the diagonal edge in a first position in which the first leg is engaged by the magnet to hold the first leg tightly against the diagonal edge with the second leg lying flat against either one of the broad surfaces. The first position may be used for storage of the invention and for cutting. A friction enhancing coating 19, such as a rubbery material or cork, for example, may be provided on the outer surface of the fence elements to prevent the board from sliding during cutting. The fence elements also convert the board into a dispensing trough for use after cutting. The fences 11 attach for trough operation by means of the second leg 14 engaging at least one magnet 9 to hold the second leg tightly against the diagonal edge with the first leg 12 lying flat against the support surface 28 to thereby provide two fence members extending above the cutting surface to guide cut items toward an opening 16 that is defined by the space between the fence members 11 at the first transverse edge 3. The opening 16 may be made smaller by sliding the fences 11 closer together for dispensing the cut material into a small container, or moved farther apart when dispensing into a larger container such as a frying pan where one might want to distribute the material more widely and uniformly.

Both broad faces 27 and 28 of the cutting board may be adapted for use as cutting surfaces. They may both be provided with drainage grooves 20. There may be some marking or designation (not shown) to distinguish each cutting surface so that one may be used only for meat, for example.

The diagonal edges or fence supports may be disposed at an angle to each other of from 80 to 180 degrees. Angles from 70 to 110 have been found to be useful. As best seen in FIG. 8, a portion 25 of the cutting board member between the diagonal edges may be cut away to facilitate passage over sink rim 26 to discard cuttings into a sink.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A cutting board assembly comprising:
a generally horizontal board member having a board thickness, opposed first and second longitudinal edges, and opposed first and second transverse edges:
a first diagonal edge between the first transverse edge and the first longitudinal edge;
a second diagonal edge between the first transverse edge and the second longitudinal edge:
the longitudinal edges, the transverse edges, and the diagonal edges forming a perimeter defining a broad upper surface and an opposed broad lower surface spaced apart by the board thickness;
at least one permanent magnet embedded in each of the diagonal edges with an outer face of the magnet coplanar with a planar surface of the diagonal edge;
two elongate ferromagnetic fence elements, each element having a first leg and a second leg disposed at right angles to the first leg, the first leg extending from the second leg a distance no greater than the thickness of the board member and the second leg extending from the first leg a distance at least twice that of the thickness of the board member;
the fence elements being separable from the board member and adapted to cooperate with the diagonal edge in a first position in which the first leg is engaged by the at least one magnet to hold the first leg tightly against the diagonal edge and with the second leg lying flat against one of the broad surfaces, and a dispensing trough second position in which the second leg is engaged by the at least one magnet to hold the second leg tightly against the diagonal edge with the first leg lying flat against one of the broad surfaces to thereby provide two fence members extending above the other surface to guide cut items toward an opening defined by a space between the fence members at the first transverse edge.

2. The cutting board assembly of claim 1 in which the opening between the fence members is adjustable.

3. The cutting board assembly of claim 1 in which at least one broad surface is provided with a drainage groove.

4. The cutting board assembly of claim 1 in which a friction enhanced surface is applied to each of the fence elements arranged to hold the board steady when cutting items.

5. The cutting board assembly of claim 1 in which the board thickness is reduced at the first transverse edge to provide clearance at a sink edge.

6. A cutting board comprising:
a generally horizontal board member having a thickness, opposed first and second longitudinal edges, and opposed first and second transverse edges:
a first diagonal edge between the first transverse edge and the first longitudinal edge;
a second diagonal edge between the first transverse edge and the second longitudinal edge:
the longitudinal edges, the transverse edges, and the diagonal edges forming a perimeter defining a broad upper surface and an opposed broad lower surface spaced apart by the thickness;
the diagonal edges each having an elongate planar surface at right angles to the upper and lower broad surfaces, the elongate planar surfaces disposed at an angle to each other of between eighty and one hundred and ten degrees;
at least one permanent magnet embedded in each of the diagonal edges with an outer face of the magnet coplanar with the planar surface of the diagonal edge;
two elongate ferromagnetic fence elements, each element having a first leg and a second leg disposed at right angles to the first leg, the first leg extending from the second leg a distance no greater than the thickness of the board member and the second leg extending from the first leg a distance at least twice the thickness of the board member;
the fence elements being separable from the board member and adapted to cooperate with the diagonal edge in a first position in which the first leg is engaged by the at least one magnet to hold the first leg tightly against the diagonal edge and the second leg lying flat against one of the broad surfaces, and a dispensing trough second position in which the second leg is engaged by the at least one magnet to hold the second leg tightly against the diagonal edge with the first leg lying flat against one of the broad surfaces to thereby provide two fence members extending above the other broad surface to guide cut items toward an opening defined by a space between the fence members at the first transverse edge.

7. The cutting board of claim 6 in which the opening between the fence members is adjustable.

8. The cutting board of claim 6 in which at least one broad surface is provided with a drainage groove.

9. The cutting board of claim 6 in which a friction enhanced surface is applied to each of the fence elements arranged to hold the board steady when cutting items.

10. The cutting board of claim 6 in which the board thickness is reduced at the first transverse edge to provide clearance at a sink edge.

11. A cutting board comprising:
a board member having two opposed broad surfaces spaced apart by a board thickness defined by a perimeter;
the perimeter including first and second fence supports, the fence supports having elongate planar surfaces disposed at an angle to each other of between eighty and one hundred and eighty degrees;
at least one permanent magnet embedded in each of the fence supports with an outer face of the at least one magnet coplanar with the planar surface of the fence support;
two elongate ferromagnetic fence elements, each element having a first leg and a second leg disposed at substantially right angles to the first leg, the first leg extending from the second leg a distance no greater than the board thickness and the second leg extending from the first leg a distance at least twice that of the board thickness;
the fence elements being separable from the board member and adapted to cooperate with the fence support in a first position in which the first leg is engaged by the at least one magnet to hold the first leg tightly against the fence support surface and with the second leg lying flat against one of the broad surfaces, and a dispensing trough second position in which the second leg is engaged by the at least one magnet to hold the second leg tightly against the fence support surface with the first leg lying flat against one of the broad surfaces to thereby provide two fence members extending above the other broad surface to guide cut items toward an opening defined by a space between the fence members.

12. The cutting board of claim 11 in which the opening between the fence members is adjustable.

13. The cutting board of claim 11 in which at least one broad surface is provided with a drainage groove.

14. The cutting board of claim 11 in which a friction enhanced surface is applied to each of the fence elements arranged to hold the board steady when cutting items.

15. The cutting board of claim 11 in which the board thickness is reduced at a portion of the perimeter between fence supports to provide clearance at a sink edge.

* * * * *